United States Patent
Andrés Maldonado et al.

(10) Patent No.: US 12,241,986 B1
(45) Date of Patent: Mar. 4, 2025

(54) UTC TRACEABILITY SUPPORT FOR TERMINAL DEVICES

(71) Applicant: Nokia Technologies Oy, Espoo (FI)

(72) Inventors: Pilar Andrés Maldonado, Aalborg (DK); Troels Emil Kolding, Klarup (DK); Thomas Haaning Jacobsen, Nørresundby (DK); Kari Juhani Niemelä, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/893,057

(22) Filed: Sep. 23, 2024

Related U.S. Application Data

(63) Continuation of application No. 18/700,184, filed as application No. PCT/EP2021/078246 on Oct. 13, 2021.

(51) Int. Cl.
 *G01S 19/25* (2010.01)
 *H04W 56/00* (2009.01)

(52) U.S. Cl.
 CPC ......... *G01S 19/256* (2013.01); *H04W 56/001* (2013.01)

(58) Field of Classification Search
 CPC .................. G01S 19/256; H04W 56/001
 See application file for complete search history.

(56) References Cited

U.S. PATENT DOCUMENTS

| | | | |
|---|---|---|---|
| 2020/0259896 A1* | 8/2020 | Sachs | H04W 56/0065 |
| 2021/0266086 A1 | 8/2021 | Liu et al. | |

FOREIGN PATENT DOCUMENTS

| | | |
|---|---|---|
| CN | 113110016 A | 7/2021 |
| EP | 2852087 A1 | 3/2015 |
| WO | 2020111994 A1 | 6/2020 |
| WO | 2020151806 A1 | 7/2020 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

(Continued)

*Primary Examiner* — Kyaw Z Soe
(74) *Attorney, Agent, or Firm* — Robert P. Michal, Esq.; Carter DeLuca

(57) ABSTRACT

An apparatus including at least one processor and at least one memory including computer program code. The at least one memory and the computer program code configured, with the at least one processor, to cause the apparatus at least to receive, from a serving access node, a downlink radio resource control message including reference time information for a clock provided by the serving access node and traceability information for enabling traceability of the clock to a reference time standard. The traceability information includes at least information on a clock class indicative of a current status of the clock provided by the serving access node.

20 Claims, 6 Drawing Sheets

(56) References Cited

OTHER PUBLICATIONS

"3rd Generation Partnership Project; Technical Specification Group Services and System Aspects; System architecture for the 5G System (5GS); Stage 2 (Release 17)", 3GPP TS 23.501, V17.1.1, Jun. 2021, pp. 1-526.

"3rd Generation Partnership Project; Technical Specification Group Radio Access Network; LTE Positioning Protocol (LPP) (Release 16)", 3GPP TS 37.355, V16.5.0, Jun. 2021, pp. 1-298.

"3rd Generation Partnership Project; Technical Specification Group Radio Access Network; NG-RAN; Architecture description (Release 16)", 3GPP TS 38.401, V16.6.0, Jul. 2021, pp. 1-79.

"IEEE Standard for a Precision Clock Synchronization Protocol for Networked Measurement and Control Systems", IEEE Instrumentation and Measurement Society, IEEE Std 1588™—2019, Nov. 7, 2019, 499 pages.

"Timing characteristics of enhanced primary reference time clocks, Amendment 2", Series G: Transmission Systems and Media, Digital Systems and Networks, Packet over Transport aspects—Synchronization, quality and availability targets, Series Y: Global Information Infrastructure, Internet Protocol Aspects, Next-Generation Networks, Internet of Things and Smart Cities, Internet protocol aspects—Transport, ITU-T Recommendation G.8272.1/Y. 1367.1, Aug. 2019, 24 pages.

International Search Report and Written Opinion received for corresponding Patent Cooperation Treaty Application No. PCT/EP2021/078246, dated Jul. 7, 2022, 12 pages.

International Prelimianry Report on Patentability received for corresponding Patent Cooperation Treaty Application No. PCT/EP2021/078246, dated Apr. 16, 2024 (7 pages).

European Office Action for Application No. 21793900.8 dated Oct. 8, 2024, 5 pages.

\* cited by examiner

UTC TRACEABILITY SUPPORT FOR TERMINAL DEVICES

CROSS-REFERENCE TO RELATED APPLICATIONS

This application is a continuation application of U.S. patent application Ser. No. 18/700,184 filed Apr. 10, 2024, which claims priority to International Application No. PCT/EP2021/078246 filed Oct. 13, 2021, the disclosure of each of these applications is expressly incorporated herein by reference in their entirety.

TECHNICAL FIELD

Various example embodiments relate to wireless communications.

BACKGROUND

In a 5G communication system, terminal devices can be relatively time-synchronized to the 5G network or absolutely time-synchronized to the same global 5G clock (corresponding, e.g., to the coordinated universal time, UTC). The 5G clock may be delivered to the terminal devices, for example, via a ReferenceTimeInfo (RTI) information element (IE) that together with the estimation of the system frame number (SFN) reference, enables the terminal device to be absolute time synchronized to the 5G clock. However, the terminal device (or Device-Side Time Sensitive Networking Translator, DS-TT associated with the terminal device) is unable to ensure (metrological) traceability of its clock to UTC based on information received via the control plane.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Embodiments and examples described herein may be implemented in any communications system comprising wireless connection(s). In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, substantially the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The term "traceability" (or equally "metrological traceability") refers to an unbroken chain of calibrations relating measurements performed by an instrument leading to a known reference. A calibration is a comparison between two measurements, where one of the measurements being of known correctness (i.e., it is a reference or standard measurement). The traceability may refer in the context of this application specifically to time traceability (or equally metrological time traceability). In other words, traceability is the property of a time measurement result, such as a network time protocol (NTP) or precision time protocol (PTP) timestamp, using which the result can be related to a reference, such as UTC, through an unbroken chain of comparisons, all having stated uncertainties.

Figure 1:
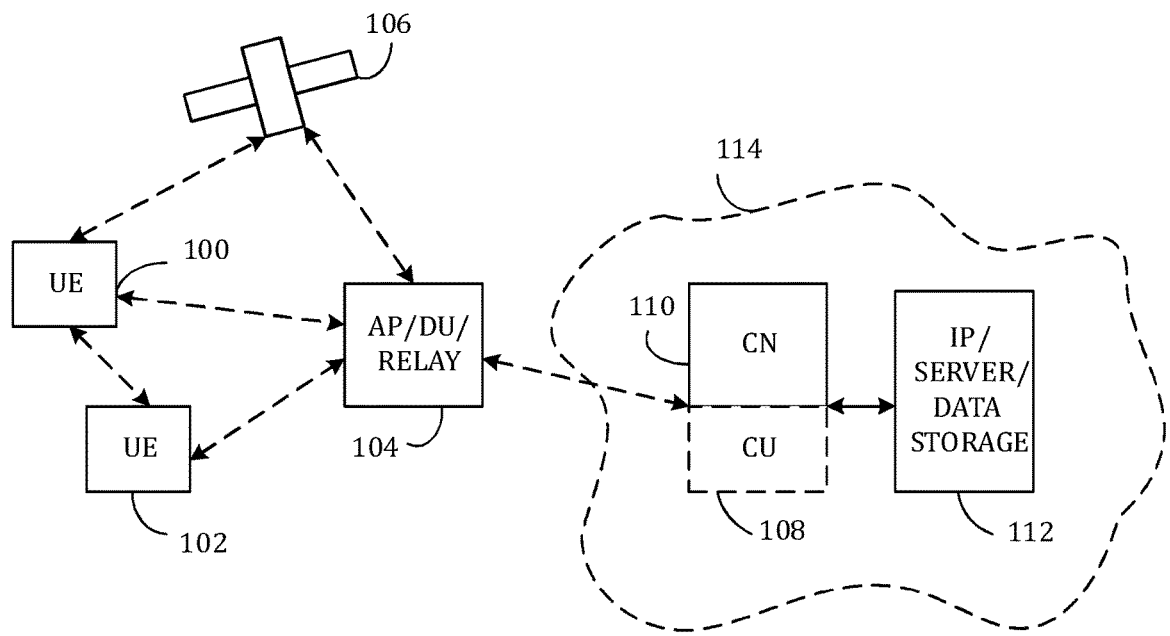
FIG. 1 illustrates an exemplified wireless communication system.

FIG. 1 depicts examples of simplified system architectures showing some elements and functional entities, some or all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell. The physical link from a user device to a (e/g) NodeB is called uplink or reverse link and the physical link from the (e/g) NodeB to the user device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signalling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The core network 110 may comprise a Location Management Function (LMF) and/or some other network node for performing position estimation of terminal devices.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network which is a scenario in which objects are provided with the ability to transfer data over a network without needing human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

The user device may comprise a 5G modem, a GNSS and/or GPS receiver. Additionally or alternatively, the user device may comprise or be (communicatively) connected to a Device-Side Time Sensitive Networking Translator (DS-TT). TSN Translators are used when a (5G) network is supporting integration as a bridge in a TSN (Time Sensitive Networking) network or enabling support for time synchronization and/or some aspects of Time Sensitive Communication (TSC). In particular, both the terminal device and a user plane function (UPF) may support TSN translator functionality allowing the (5G) network components. In addition to referenceTimeInfo, the terminal device may receive a 5G clock or some other clock(s) via precision time protocol (PTP) or generic PTP (gPTP) messages sent at the user plane. Specifically, (g) PTP operations (e.g., timestamping) may be performed at the edges of the 5G system (i.e., at the terminal device side and the network side) at the DS-TT/NW-TT.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different needs on latency, reliability, throughput and mobility.

The current architecture in LTE networks is fully distributed in the radio and fully centralized in the core network. The low latency applications and services in 5G need to bring the content close to the radio which leads to local break out and multi-access edge computing (MEC). 5G enables analytics and knowledge generation to occur at the source of the data. This approach needs leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic selfhealing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are needed to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) nodeBs), a home node B gateway, or HNB-GW (not shown in FIG. 1). A HNB Gateway (HNB-GW), which is typically installed within an operator's network may aggregate traffic from a large number of HNBs back to a core network.

In the following, an access node (e.g., a gNB) as discussed in relation to embodiments may form a part of a larger device such as a satellite or a base station.

In a 5G communication system, terminal devices can be relatively time-synchronized to the 5G network or absolutely time-synchronized to the same global 5G clock (corresponding, e.g., to the coordinated universal time, UTC). The 5G clock may be delivered to the terminal devices, for example, via a ReferenceTimeInfo (RTI) information element (IE) that together with the estimation of the system frame number (SFN) reference, enables the terminal device to be absolute time synchronized to the 5G clock. RTI may be received in a control plane time synchronization process using RRC/SIB9 signaling. Specifically, the terminal device may obtain referenceTimeInfo via periodical broadcasting on downlink shared channel (DL-SCH), broadcasting on-demand on DL-SCH, unicasting on DL-SCH or unicasting on-demand on DL-SCH. If time synchronization service is based solely on said ReferenceTimeInfo, the terminal device is aware of the 5G clock and associated uncertainty based on information received from the access node. However, the status (or state) of the clock is not informed to the terminal device by the access node. For example, the terminal device is not aware whether the access node is currently locked to a primary reference clock (PRC) or has lost the PRC (i.e., is no longer synchronized with it). Thus, the terminal device (or Device-Side Time Sensitive Networking Translator, DS-TT) is unable to ensure time traceability of its clock to UTC based on the information received via the control plane.

When an element previously synchronized or syntonized to a clock (i.e., the PRC) loses the clock reference (e.g., it is no longer locked to the clock), it enters a holdover mode and stays in said holdover mode as long as it is within a pre-defined accuracy requirement of said holdover mode (as defined by a designated holdover specification).

Having different time sources allows clock redundancy within the network to keep time distribution consistency even if one of the sources fails. However, for some use cases, only receiving the time reference with the necessary accuracy is not enough. Namely, it is equally important to have traceability to the time reference. Some examples of use cases that require traceability to UTC in all network elements are:

Financial markets: The ability to verify continuously when events take place (i.e., time traceability) is fundamental in enabling regulatory oversight and analyzing the order in which trades are placed. For example, accurate time stamps are used to settle disagreements and to prevent fraud (MiFID II compliancy at the time-stamp). For example, in Europe, the European Union regulations define that operators of trading venues and their members or participants should establish a system of traceability to UTC. Only systems that provide direct traceability to the UTC issued and maintained by a timing center specified by the International Bureau of Weights and Measures are considered as acceptable to record reportable events.

Smart grid cases: In such cases, dynamic distributed measurements are needed, a common traceable time and frequency reference source ensures that the devices can interoperate, properly handle timing discontinuities (leap second) and monitor/detect anomalous behavior.

The embodiments to be discussed below seek to ensure that time traceability to UTC is established at the terminal device. By ensuring time traceability at the terminal device, the terminal device is capable of evaluating the accuracy of its own clock relative to UTC.

Figure 2:
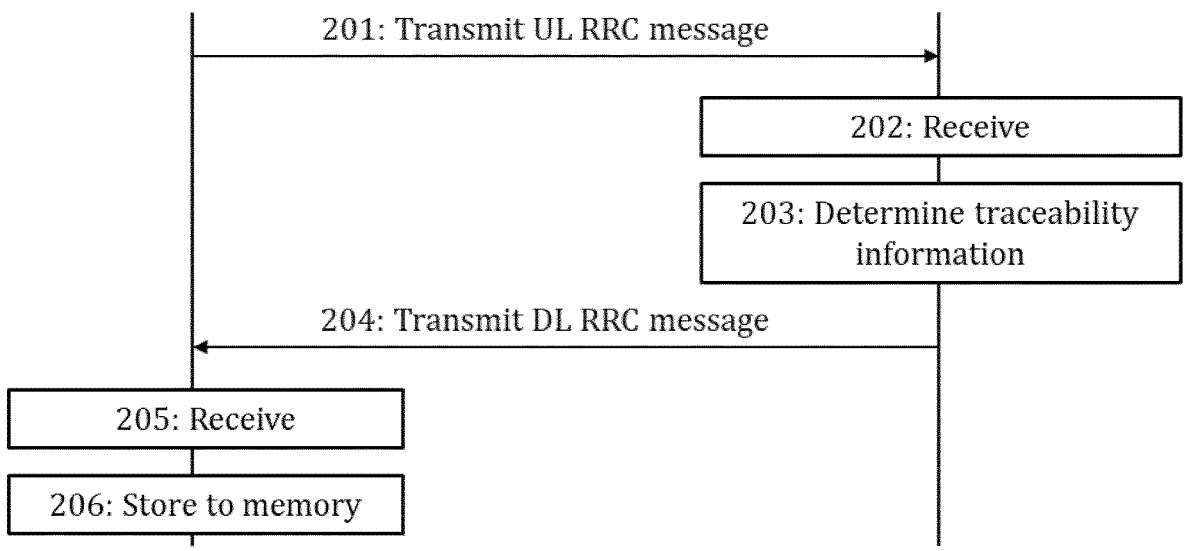
FIGS. 2, 3, 4, 5, 6, 7A and 7B illustrate exemplary processes according to embodiments.

FIG. 2 illustrates processes according to embodiments for ensuring time traceability to UTC of the system clock of the terminal device. FIG. 2 illustrates specifically signaling between a terminal device and an access node. Said terminal device may be, e.g., either of the terminal devices 100, 102 of FIG. 1. Similarly, the access node may be the access node 104 of FIG. 1. The actions pertaining to the terminal device and/or the access node may be performed or caused to be performed, in some embodiments, by an apparatus (e.g., a computing device) comprised in or communicatively connected to the terminal device and/or the access node, respectively. The terminal device may comprise or be communicatively connected to a 5G modem and/or a device-side TSN translator (DS-TT).

Referring to FIG. 2, it may be initially assumed that the terminal device is operating in a radio resource control (RRC) connected mode, i.e., that a RRC connection has been previously established between the terminal device and a serving access node. The access node may, thus, be a serving access node of the terminal device.

The process of FIG. 2 is initiated by the terminal device transmitting, in message 201, to the (serving) access node, an uplink (UL) RRC message comprising an indication (e.g., a flag) of preference for time traceability to UTC. The uplink (UL) RRC message may correspond to a UE assistance information message, where the indication of preference for time traceability to UTC is a particular (new) IE of the UE assistance information message.

The access node receives, in block 202, the UL RRC message indicating the preference for time traceability to UTC from the terminal device. Then, the access node determines, in block 203, traceability information for enabling traceability of the clock of the access node to UTC based on said indication. The traceability information comprises at least information on a clock class indicative of a current status of the clock provided by the access node or more specifically of a current locking or synchronization status of the clock provided by the access node.

The clock class may be defined, e.g., to have a value selected from a set of pre-defined values. Each of said pre-defined values may indicate a particular status or state of the clock of the access node. The set of pre-defined values may relate to the following statuses of the system clock (or a subset thereof):

the serving access node is locked to (i.e., synchronized with) a primary reference clock (PRC),
the serving access node is in a holdover mode after losing the primary reference clock but still within a designated holdover specification,
the serving access node is locked to a local clock,
the serving access node is in the holdover mode after losing a local clock but still within the designated holdover specification and
the serving access node is in the holdover mode and is no longer within the designated holdover specification.

Here, it is assumed that when an access node which is synchronized or syntonized to a clock (i.e., the PRC) loses the clock reference (e.g., it is no longer locked to the PRC), it enters a holdover mode. The access node stays in said holdover mode as long as it is within the designated holdover specification (i.e., within one or more pre-defined accuracy requirements of said holdover mode). The PRC is defined, in general, as being a master timing source within the (5G) network.

The designated holdover specification may define at least one or more pre-defined conditions (or requirements) regarding allowed clock drift during a holdover period (during the period of holdover mode operation). The one or more pre-defined conditions for allowed clock drift may comprise, for example, a pre-defined upper threshold for clock drift and/or a pre-defined upper threshold for the time spent in the holdover mode (i.e., time which has passed since the access node entered the holdover mode). The clock drift may be calculated (dynamically) by the access node (e.g., based on the time spent in the holdover mode). The time spent in the holdover mode may be considered, in general, indicative of the amount of clock drift accumulated during the operation in the holdover mode. The clock drift may, for example, be assumed to be directly proportional to the time spent in the holdover mode (e.g., the clock may be evaluated to accumulate 100 ns clock drift every 2 hours).

In some embodiments, said pre-defined upper threshold for clock drift may be defined, instead of a constant value, as a function dependent on the time spent in the holdover mode. For example, said pre-defined upper threshold for clock drift may be defined according to $|\Delta x(t)| \leq A + Bt$, where $|\Delta x(t)|$ is the amount of clock drift (or clock error), t is the time spent in the holdover mode and A and B are (positive) constants. A and B may, for example, have values 30 and $5.787037 \ast 10^{-5}$ (assuming that t is given in nanoseconds).

The access node transmits, in message 204, to the terminal device, a downlink (DL) RRC message comprising reference time information (RTI) for the clock of the access node and the traceability information for the clock of the access node.

The reference time information may comprise at least information on uncertainty of the reference time information provided by the access node (e.g., uncertainty field of the RTI IE as defined below) and/or an origin of time defined for the clock of the access node (e.g., the timeInfoType field of the RTI IE as defined below).

The reference time information may correspond specifically to ReferenceTimeInfo IE. The ReferenceTimeInfo IE may comprise, in general, one or more of the following fields:

referenceSFN: This field indicates the reference SFN corresponding to the reference time information. If referenceTimeInfo field is received in DLInformationTransfer message, this field indicates the SFN of PCell.

time: This field indicates time reference with 10 ns granularity. The indicated time is referenced at the network, i.e., without compensating for RF propagation delay. The indicated time in 10 ns unit from the origin is refDays*86400*1000*100000+refSeconds*1000*100000+refMilliSeconds*100000+refTenNanoSeconds. The refDays field specifies the sequential number of days (with day count starting at 0) from the origin of the time field. If the referenceTimeInfo field is received in DLInformationTransfer message, the time field indicates the time at the ending boundary of the system frame indicated by referenceSFN. The terminal device considers this frame (indicated by referenceSFN) to be the frame which is nearest to the frame where the message is received (which can be either in the past or in the future). If the referenceTimeInfo field is received in SIB9, the time field indicates the time at the SFN boundary at or immediately after the ending boundary of the SI-window in which SIB9 is transmitted. If referenceTimeInfo field is received in SIB9, this field is excluded when determining changes in system information, i.e. changes of time should neither result in system information change notifications nor in a modification of valueTag in SIB1.

timeInfoType: If timeInfoType is not included, the time indicates the GPS time and the origin of the time field is 00:00:00 on Gregorian calendar date 6 Jan. 1980 (start of GPS time). If timeInfoType is set to localClock, the origin of the time is unspecified.

uncertainty: This field indicates the uncertainty of the reference time information provided by the time field. The uncertainty is 25 ns multiplied by this field. If this field is absent, the uncertainty is unspecified.

In some embodiments, the information on the origin of time included in the reference time information may have a value selected from three or more pre-defined values corresponding to different origins of time (e.g., different GNSS systems such as Galileo) defined for the clock of the access node. In other words, the reference time information may comprise an extended version of the timeInfoType field of the ReferenceTimeInfo IE as defined above.

The terminal device receives in block 205, from a serving access node, the DL RRC message as defined above. Thereafter, the terminal device may store, in block 206, at least the traceability information (or a part thereof) and/or the reference time information (or a part thereof) to a memory. Subsequently, the traceability information may be used, e.g., for verification and/or for storage outside of the terminal device (external to its 5G modem).

As described above, in certain time-critical use case, the clock of the terminal device may be required to have sufficiently high accuracy. For example, some time-critical use cases (e.g., some smart grid use cases) may require that the clock provided to the terminal device by its serving access node corresponds to a certain clock class (e.g., indicating that the serving access node is locked to the PRC) or to a certain set of clock classes (e.g., indicating that the serving access node is locked to the PRC or that the serving access node is in a holdover mode after losing the PRC but still within a designated holdover specification).

Figure 3:
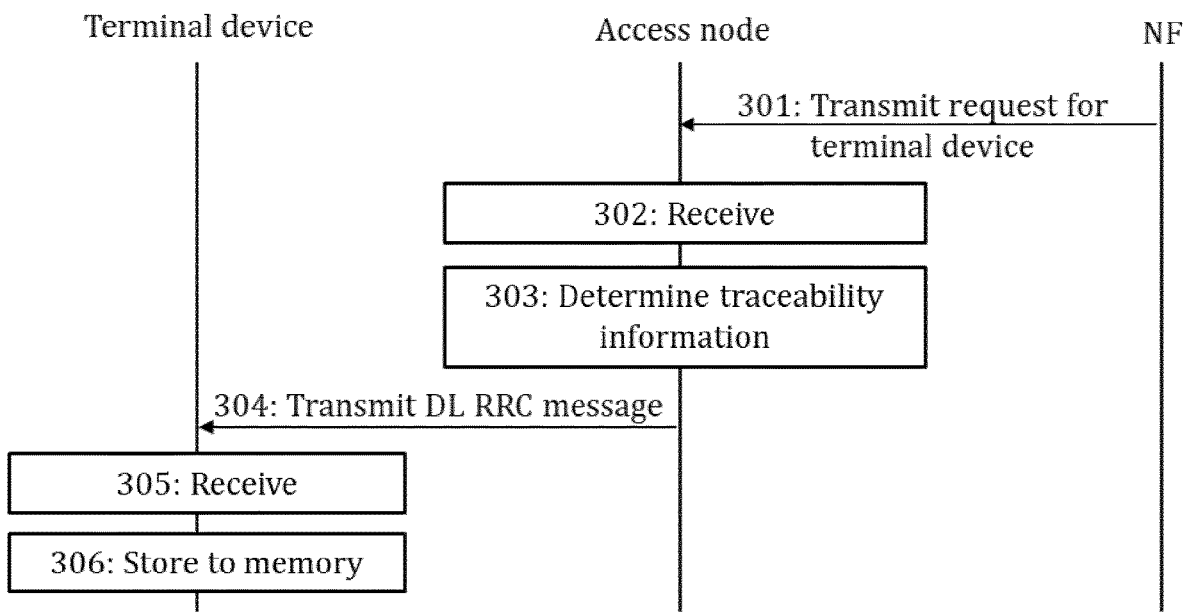

FIG. 3 illustrates another set of processes according to embodiments for ensuring time traceability to UTC of the system clock of the terminal device. FIG. 3 illustrates specifically signaling between a terminal device, an access node and a network function (NF) of a core network. Said terminal device may be, e.g., either of the terminal devices 100, 102 of FIG. 1. Similarly, the access node may be the access node 104 of FIG. 1. The network function may form a part of the core network 110 of FIG. 1. The network function may correspond to a particular network node or multiple network nodes. The network function may be communicatively connected to the (serving) access node directly or via one or more network nodes. The network function may comprise at least or correspond to an application function (AF) or a location management function (LMF). The actions pertaining to the terminal device, the access node and/or the network function may be performed or caused to be performed, in some embodiments, by an apparatus (e.g., a computing device) comprised in or communicatively connected to the terminal device, the access node and/or the network function, respectively. The terminal device may comprise or be communicatively connected to a 5G modem and/or a device-side TSN translator (DS-TT).

Referring to FIG. 3, it may be initially assumed that the terminal device is operating in a radio resource control (RRC) connected mode, i.e., that a RRC connection has been previously established between the terminal device and a serving access node. The access node may, thus, be a serving access node of the terminal device.

The process of FIG. 3 is initiated by the network function transmitting, in message 301, to the access node (optionally via one or more network nodes), a request requesting the preference for the traceability to UTC for the terminal device (i.e., on behalf of the terminal device). The access node receives, in block 302, said request. In other words, instead of the terminal device triggering the process as in FIG. 2, here the NF triggers the process. Specifically, the NF may request UTC traceability preference for a terminal device or a group of a plurality of terminal devices.

In some embodiments, the request may correspond to a time synchronization service request comprising one or more indications (e.g., flags) for indicating the preference for time traceability to UTC for one or more terminal devices. As a result, the network function (which may be here specifically an application function) is able to inform the network of the interest in UTC traceability at the terminal device side. Additionally, the network function may subscribe to RTI status information. For example, the network function may retrieve from the network the uncertainty estimated at the access node, the timeInfoType together with the clock status notifications of the access node serving the terminal device. This will enable the network function to be aware of the clock that is disseminated towards the terminal device and collect information for UTC traceability proofing up to the access node point.

The actions described in connection with elements 303 to 306 may correspond fully to the actions described in connection with elements 203 to 206.

If the request corresponds to a time synchronization service request comprising a plurality of indications (e.g., flags) for indicating the preference for time traceability to UTC for a plurality of terminal devices, the actions pertaining to elements 304 to 306 may be carried out separately for each of the plurality of terminal devices. The same reference time information and/or the same traceability information may be used for each of said plurality of terminal devices.

In some alternative embodiments, the access node may cause transmitting, to the network function, a message comprising the reference time information for the clock and/or the traceability information for the clock. Subsequently, the network node may forward said information (optionally along with further information) to the terminal device via the access node (or some other access node). These actions may replace the (direct) transmission of message 304.

Figure 4:
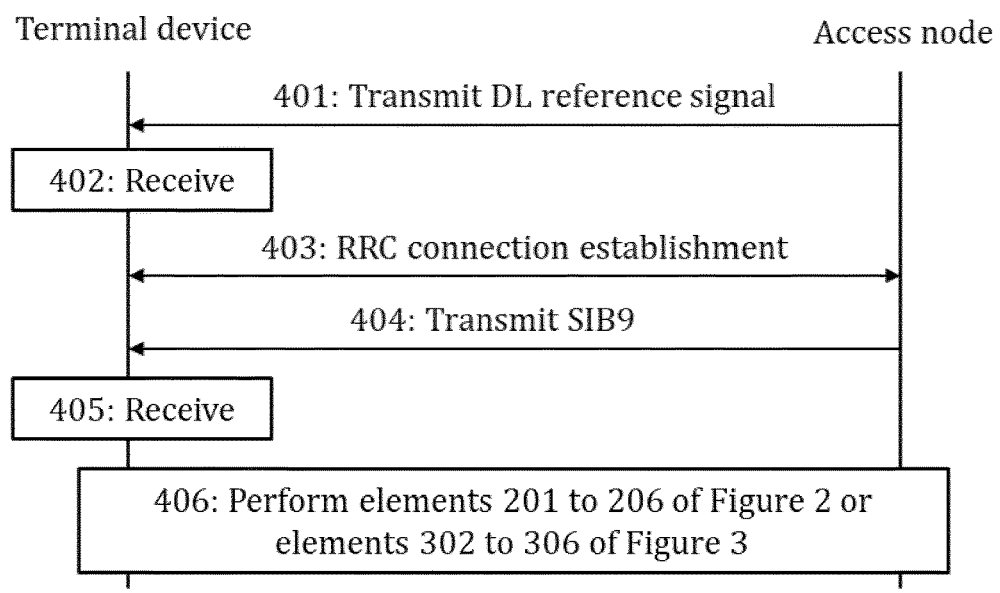

FIG. 4 illustrates a set of processes according to embodiments which may precede the processes discussed in connection with FIG. 2 or 3. FIG. 4 illustrates specifically signaling between a terminal device and an access node. Said terminal device may be, e.g., either of the terminal devices 100, 102 of FIG. 1. Similarly, the access node may be the access node 104 of FIG. 1. The actions pertaining to the terminal device and/or the access node may be performed or caused to be performed, in some embodiments, by an apparatus (e.g., a computing device) comprised in or communicatively connected to the terminal device and/or the access node, respectively. The terminal device may comprise or be communicatively connected to a 5G modem and/or a device-side TSN translator (DS-TT).

Referring to FIG. 4, it may be initially assumed that a RRC connection has not been established between the terminal device and a serving access node. The terminal device may be operating, e.g., in a RRC idle or inactive mode. The terminal device may be performing cell search.

The access node transmits, in message 401, a DL reference signal to the terminal device. The DL reference signal may be, for example, a synchronization signal block (SSB) or a synchronization signal burst (SSB) comprising multiple SSBs. The DL reference signal may be used, e.g., for acquiring time and frequency synchronization with a cell provided by the access node and/or detecting Physical layer Cell ID (PCI) of the cell.

The terminal device receives, in block 402, the DL reference signal and based thereon causes the establishment of a RRC connection in messages 403. The RRC connection establishment may be carried out in a conventional manner known in the art.

The access node transmits, in message 404, a SIB9 message to the terminal device (using the established RRC connection). The SIB9 message comprises information related to GPS time and UTC. The terminal device may use the parameters provided in the SIB9 message, for example, to obtain the UTC, the GPS time and the local time.

Specifically, the SIB9 message may comprise time information ("timeInfo" field) which may comprise UTC time information ("timeInfoUTC" field), daylight saving time information ("dayLightSavingTime" field), leap second information ("leapSeconds" field) and/or local time offset information ("localTimeOffset" field).

UTC time information (timeInfoUTC) is coordinated universal time corresponding to the SFN boundary at or immediately after the ending boundary of the SI-window in which SIB9 is transmitted. The field counts the number of UTC seconds in 10 ms units since 00:00:00 on Gregorian calendar date 1 Jan. 1900 (midnight between Sunday, Dec. 31, 1899 and Monday, Jan. 1, 1900).

The daylight saving time information (dayLightSavingTime) indicates if and how daylight-saving time (DST) is applied to obtain the local time. The semantics are the same as the semantics of the Daylight-Saving Time IE in 24.008. The first/leftmost bit of the bit string contains the b2 of octet 3 and the second bit of the bit string contains b1 of octet 3 in the value part of the Daylight-Saving Time IE (as shown below):

| First/leftmost bit value | Second bit value | Daylight saving time (DST) |
|---|---|---|
| 0 | 0 | No adjustment for DST |
| 0 | 1 | +1 h adjustment for DST |
| 1 | 0 | +2 h adjustment for DST |
| 1 | 1 | Reserved |

The leap second information (leapSeconds) is the number of leap seconds offset between GPS Time and UTC. UTC and GPS time are related, i.e., GPS time-leapSeconds=UTC time.

The local time offset information (localTimeOffset) is the offset between UTC and local time in units of 15 minutes.

Actual value=field value*15 minutes. Local time of the day is calculated as UTC time+localTimeOffset.

The terminal device may use the UTC time information together with the leap second information to obtain GPS time (or GPS epoch) as follows: GPS Time (in seconds)=timeInfoUTC (in seconds)−2 524 953 600 (seconds)+leapSeconds, where 2 524 953 600 is the number of seconds between 00:00:00 on Gregorian calendar date 1 Jan. 1900 and 00:00:00 on Gregorian calendar date 6 Jan. 1980 (start of GPS time). It should be noted that the terminal device has, however, no way of determining the uncertainty of the GPS time based on the information provided in the SIB9 message.

This field is excluded when determining changes in system information, i.e., changes of timeInfoUTC should neither result in system information change notifications nor in a modification of valueTag in SIB1.

Following the reception of the SIB9 message in block 405, the terminal device and the access node may proceed to operate as discussed above in connection with block 201 to 206 of FIG. 2 or blocks 302 to 306 of FIG. 3.

One of techniques for measuring uncertainty for GNSS signals is the common-view measurement or common-view method (CVM) where two local clocks located at different sites are compared to a common-view signal (CVS) broadcast from an independent transmitter. The CVS may be transmitted, e.g., by a satellite. The method requires the radio receivers to be approximately equidistant from the transmitting party (e.g., from the satellite), to make the channel delays experienced by the receivers nearly equal. The difference between the two measurements is an estimate of Clock A-Clock B. Delays that are common to both paths dSA and dSB cancel even if they are unknown according to the following equation:

$$(\text{Clock } A\text{-}S)-(\text{Clock } B\text{-}S)=(\text{Clock } A-\text{Clock } B)+(e_{SA}-e_{SB}),$$

where S is the clock (or time) of the transmitter (e.g., the satellite) and $e_{SA}$ and $e_{SB}$ are errors of clocks A and B. The components that make up the $e_{SA}$-$e_{SB}$ error term include delay differences between the two sites caused by ionospheric and tropospheric delays, multipath signal reflections, environmental conditions, or errors in the GNSS antenna coordinates. These factors can be measured or estimated and applied as a correction to the measurement, or they can be accounted for in the uncertainty analysis.

It would be beneficial if the terminal device would be not only enabled for UTC traceability but also enabled for performing common-view measurements (with its serving access node) to determine uncertainty of its own clock. This would require, however, exchange of data between the terminal device and the access node.

Figure 5:
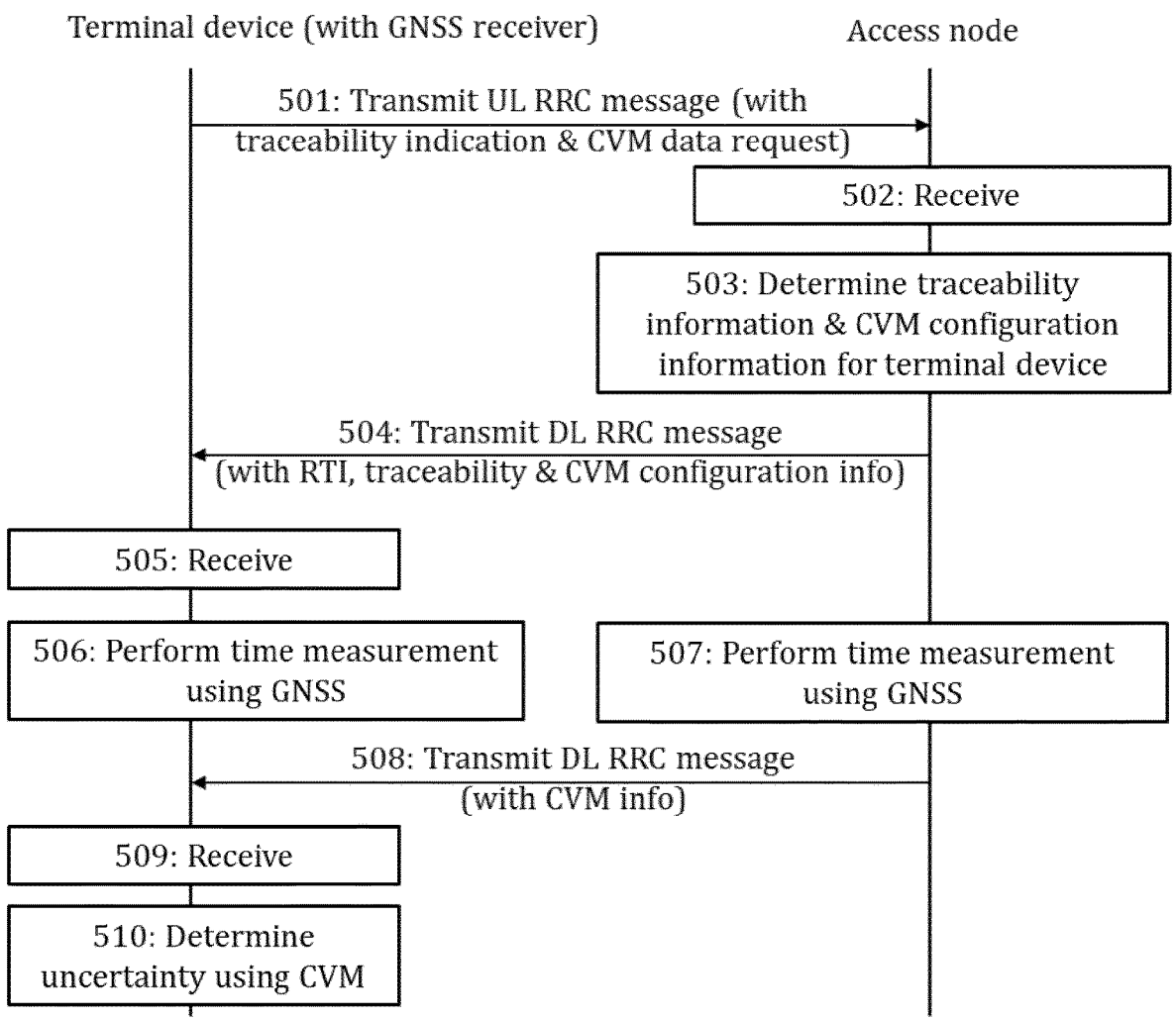

FIG. 5 illustrates processes according to embodiments for ensuring time traceability to UTC of the system clock of the terminal device as well as enabling a (rough) estimation of the uncertainty of the clock of the terminal device by the terminal device using a common-view method. FIG. 5 illustrates specifically signaling between a terminal device and an access node. Said terminal device may be, e.g., either of the terminal devices 100, 102 of FIG. 1. The terminal device (and/or the access node) may be assumed here to comprise a GNSS receiver (e.g., a GPS receiver). Similarly, the access node may be the access node 104 of FIG. 1. The actions pertaining to the terminal device and/or the access node may be performed or caused to be performed, in some embodiments, by an apparatus (e.g., a computing device) comprised in or communicatively connected to the terminal device and/or the access node, respectively. The terminal device may comprise or be communicatively connected to a 5G modem and/or a device-side TSN translator (DS-TT).

Referring to FIG. 5, it may be initially assumed that the terminal device is operating in an RRC connected mode, i.e., that a RRC connection has been previously established between the terminal device and a serving access node. The access node may, thus, be a serving access node of the terminal device. The process of elements 401 to 405 of FIG. 4 (or a part thereof) may have been carried out before the initiation of the process of FIG. 5.

Similar to the process of FIG. 2, the process of FIG. 5 is initiated by the terminal device transmitting, in message 501, to the (serving) access node, an UL RRC message comprising an indication (e.g., a flag) of preference for time traceability to UTC.

In contrast to the process of FIG. 2, the UL RRC message further comprises a request for GNSS CVM information (i.e., a GNSS CVM data request). Specifically, said request may correspond to a request for information needed for the terminal device to be able to perform CVM with the access node. To use the common-view method, the GNSS receiver of the terminal device and the access node need to be able to listen to the same satellite(s) at the same time. To this end, said request comprises at least information on a GNSS used by the terminal device (e.g., an identifier for the GNSS) and at least one identifier of at least one satellite (currently) observable (or currently observed) by the terminal device. The identifier of a satellite observable by the terminal device may correspond to a satellite number (defined, e.g., as an integer). Said identifier (or satellite number) may be defined to be similar to satelliteID field within GPS-TOW-Assist IE in A-GNSS positioning method. Said at least one satellite may correspond to a particular satellite constellation.

The access node receives, in block 502, the UL RRC message and determines, in block 503, traceability information for enabling traceability of the clock of the access node to UTC. This determination may be performed similar to as discussed above, e.g., in connection with block 203 of FIG. 2).

Moreover, the access node determines, in block 503, also GNSS CVM configuration information based on the UL RRC message. The GNSS CVM configuration information may comprise information on when and using which satellite(s) of the GNSS (currently) observable by the terminal device (and the access node) at least one GNSS time measurement should be performed by the access node and the terminal device (simultaneously). In other words, the GNSS CVM configuration information comprises GNSS time measurement timing information and information on at least one satellite observable by both the terminal device and the access node (optionally also information on the GNSS supported by the terminal device and the access node). Thus, the access node may determine, in block 503, a time when the access node is available for performing (or able to perform) at least one GNSS time measurement and at least one satellite which can be observed by both the access node and the terminal device at said time. The access node may seek to select a satellite which is (at least approximately) equidistant from the terminal device and the access node.

The access node transmits, in message 504, to the terminal device, a first DL RRC message comprising reference time information (RTI) for the clock of the access node and the traceability information for said clock (similar to, e.g., message 204 of FIG. 2) and, additionally, the GNSS CVM configuration information for enabling GNSS time measurements necessary for CVM at the terminal device. Alternatively, the access node may transmit a plurality of (consecutive) first DL RRC messages comprising together the RTI, the traceability information and the GNSS CVM configuration information.

Optionally, the first DL RRC message may comprise also (UTC) time information. The time information may define at least the UTC time. The time information may correspond, e.g., to the timeInfo field which was discussed previously in connection with the SIB9 message or it may at least comprise some of the fields defined for timeInfo (e.g., at least timeInfoUTC). In other embodiments, (UTC) time information may have been received previously in a SIB9 message (e.g., as discussed in connection with message 404 of FIG. 4) and consequently the (UTC) time information does not have to be included in the first DL RRC message 504.

The terminal device receives in block 505, from the access node, the first DL RRC message as defined above. Thereafter, the terminal device may store, the information comprised in the first DL RRC message or a part thereof to a memory (not shown in FIG. 5), as described in connection with FIG. 2. The terminal device may store at least the traceability information or a part thereof.

The terminal device performs, in block 506, at least one GNSS time measurement via the GNSS receiver of the terminal device using (at least) said at least one satellite defined in the first DL RRC message 504, i.e., using a satellite which is (currently) observable by both the terminal device and the access node and which is, thus, suitable for CVM. At the same time, access node performs, in block 507, at least one (corresponding) GNSS time measurement using (at least) said at least one satellite defined in the DL RRC message 504. In other words, the terminal device and the access node measure, in blocks 506, 507, the same common-view signal transmitted by said at least one satellite defined in the first DL RRC message 504. The concurrent or synchronized timing of the measurements in blocks 506, 507 is achieved using the GNSS time measurement timing information derived by the access node and communicated to the terminal device. In general, the terminal device and/or the access node may be configured to perform GNSS time measurements periodically. Thus, two different (but concurrent) time measurements usable for CVM are derived.

The results of the at least one GNSS time measurement at the terminal device and/or at the access node (in blocks 506, 507) may be provided in the CGGTTS format. CGGTTS stands for Common GPS GLONASS Time Transfer Standard, where GLONASS is the GLobal NAvigation Satellite System. In other words, the terminal device and/or the access node may generate, in blocks 506, 507, a CGGTTS file (i.e., a file following the CGGTTS standard).

In some embodiments, frequency may also be measured in connection with said at least one GNSS time measurement at the terminal device and/or at the access node (in blocks 506, 507).

Following the performing of said at least one GNSS time measurement at the access node, the access node transmits, in message 508, a second DL RRC message comprising GNSS CVM information. The GNSS CVM information comprises at least information on the results of the at least one GNSS time measurement, i.e., information on a GNSS time (e.g., the epoch of the GNSS) acquired by the access node from said at least one of the at least one satellite. The GNSS CVM information may comprise also information on the GNSS (e.g., an identifier of the GNSS) and/or the at least one identifier of said at least one of the at least one satellite. The GNSS CVM information may also comprise time offset and/or correction information (at least if such information has not been provided as a part of said time information such as in a leapSeconds field of the timeInfo IE).

Upon receiving the second DL RRC message in block 509, the terminal device estimates, in block 510, time uncertainty of the clock at the terminal device using a common-view method based on the GNSS CVM information received from the access node and results of the at least one GNSS time measurement acquired using the GNSS receiver of the terminal device. The estimation in block 510 may further be based on the (UTC) time information (e.g., the timeInfo field).

In some embodiments, the RTI and/or the traceability information may be included in the second DL RRC message 508, instead of or in addition to the first DL RRC message 504.

Figure 6:
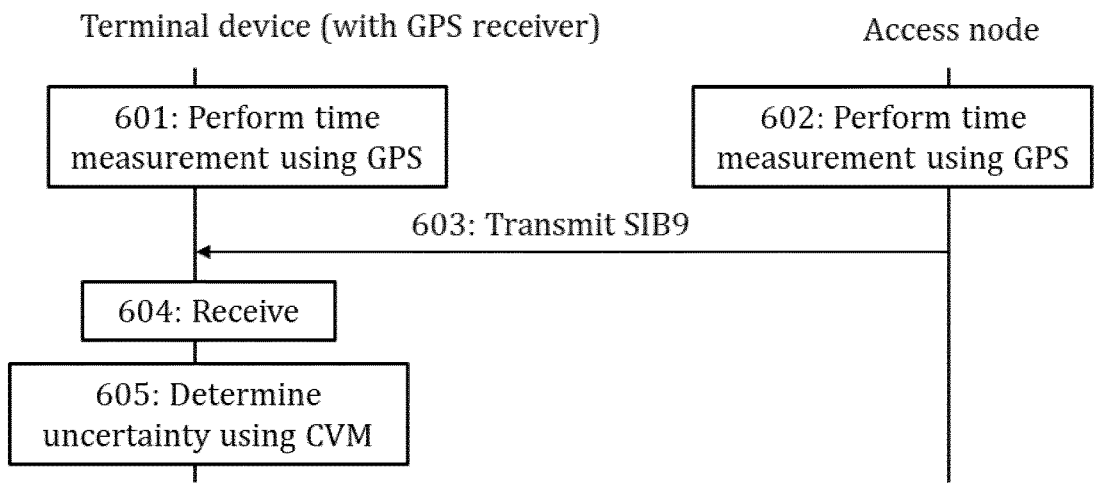

While the procedure discussed in connection with FIG. 5 may be employed with any GNSS system, if the GNSS system is a GPS system, the CVM may be carried out in a simpler manner based on the information received as a part of the SIB9 message. FIG. 6 illustrates this alternative procedure according to embodiments for enabling a (rough) estimation of the uncertainty of the clock of the terminal device by the terminal device using a common-view method. FIG. 6 illustrates specifically signaling between a terminal device and an access node. Said terminal device may be, e.g., either of the terminal devices 100, 102 of FIG. 1. The terminal device (and/or the access node) may be assumed here to comprise specifically a GPS receiver. Similarly, the access node may be the access node 104 of FIG. 1. The actions pertaining to the terminal device and/or the access node may be performed or caused to be performed, in some embodiments, by an apparatus (e.g., a computing device) comprised in or communicatively connected to the terminal device and/or the access node, respectively. The terminal device may comprise or be communicatively connected to a 5G modem and/or a device-side TSN translator (DS-TT).

Referring to FIG. 6, it may be assumed that the terminal device has already initially established an RRC connection to the access node (e.g., actions pertaining to elements 401 to 403 of FIG. 4 may have been carried out by the terminal device and the access node). The process of elements 401 to 405 of FIG. 4 (or a part thereof) may have been carried out before the initiation of the process of FIG. 5

The terminal device (using its GPS receiver) and the access node perform, in block 601, 602, simultaneous time measurements using GPS. Here, it is assumed that the GPS time measurements are performed, by both the terminal device and the access node, using at least one common (or shared) satellite. The configuration of the terminal device (and the access node) regarding which satellite(s) to use for the GPS time measurement(s) and the timing of the GPS time measurement(s) may be arranged, e.g., similar to as discussed in connection with elements 501 to 505 of FIG. 5 (though limiting the used GNSS only to GPS and possibly ignoring the traceability-related functionalities).

The access node transmits, in message 603, a SIB9 message to the terminal device (using said RRC connection) which is received by the terminal device in block 604. Elements 603, 604 may also correspond fully to elements 404, 405 of FIG. 4.

As described above in connection with FIG. 4, the SIB9 comprises at least time information (e.g., "timeInfoType" field) acquired by the serving access node for at least one satellite (in block 602) for determining a GPS clock and time offset information (e.g., "leapSeconds" field). Additionally, the SIB9 may comprise, as a new field, at least one identifier of said at least one satellite (i.e., at least one satellite number). The information included in the SIB9 message may be employed, in this case, in the common-view method and thus no separate RRC UL/DL transmission are required for acquiring GPS time information (in contrast to the more general embodiment of FIG. 5 not limited to GPS).

Therefore, the terminal device estimates, in block 605, time uncertainty of the clock of the terminal device using a common-view method based on the SIB9 message received from the access node and results of the measurement using the global positioning system receiver.

While the procedures discussed in connection with FIGS. 5 and 6 were triggered by the terminal device (similar to FIG. 2), in other embodiments, these procedures may be triggered by the NF, similar to as discussed in connection with FIG. 3.

Figure 7A:
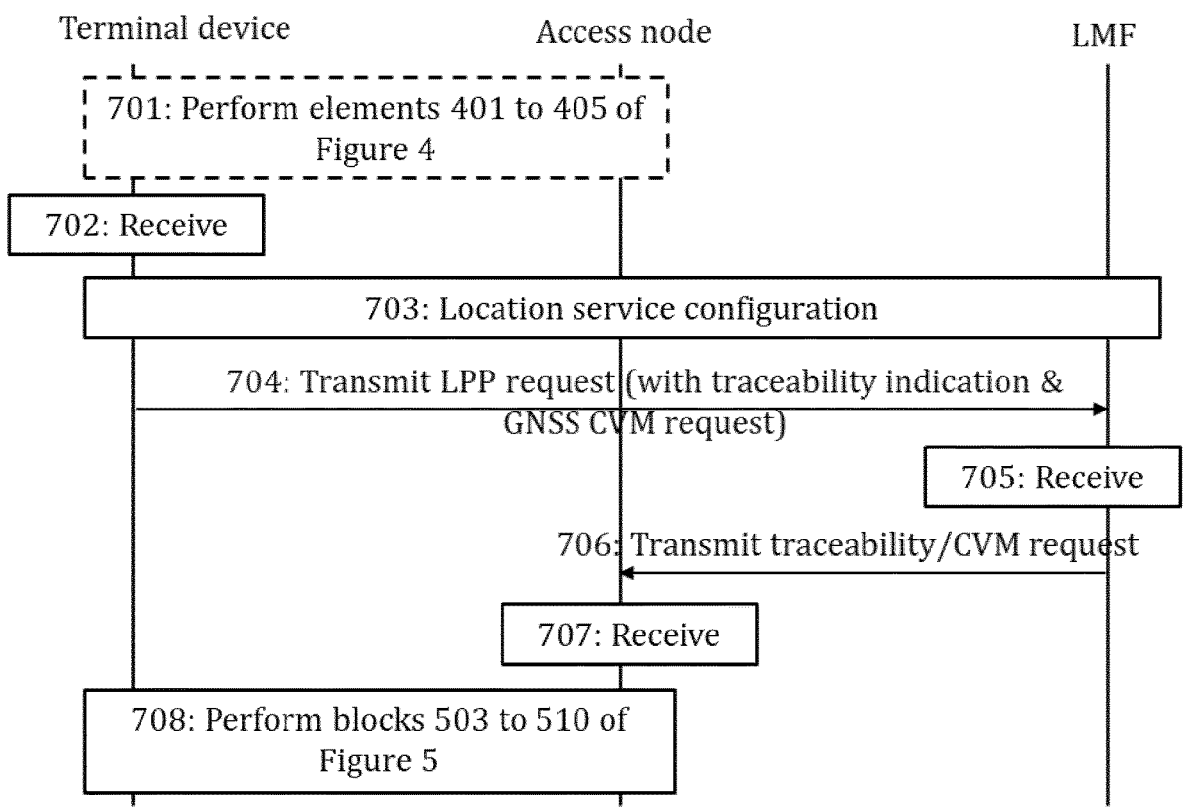
Figure 7B:
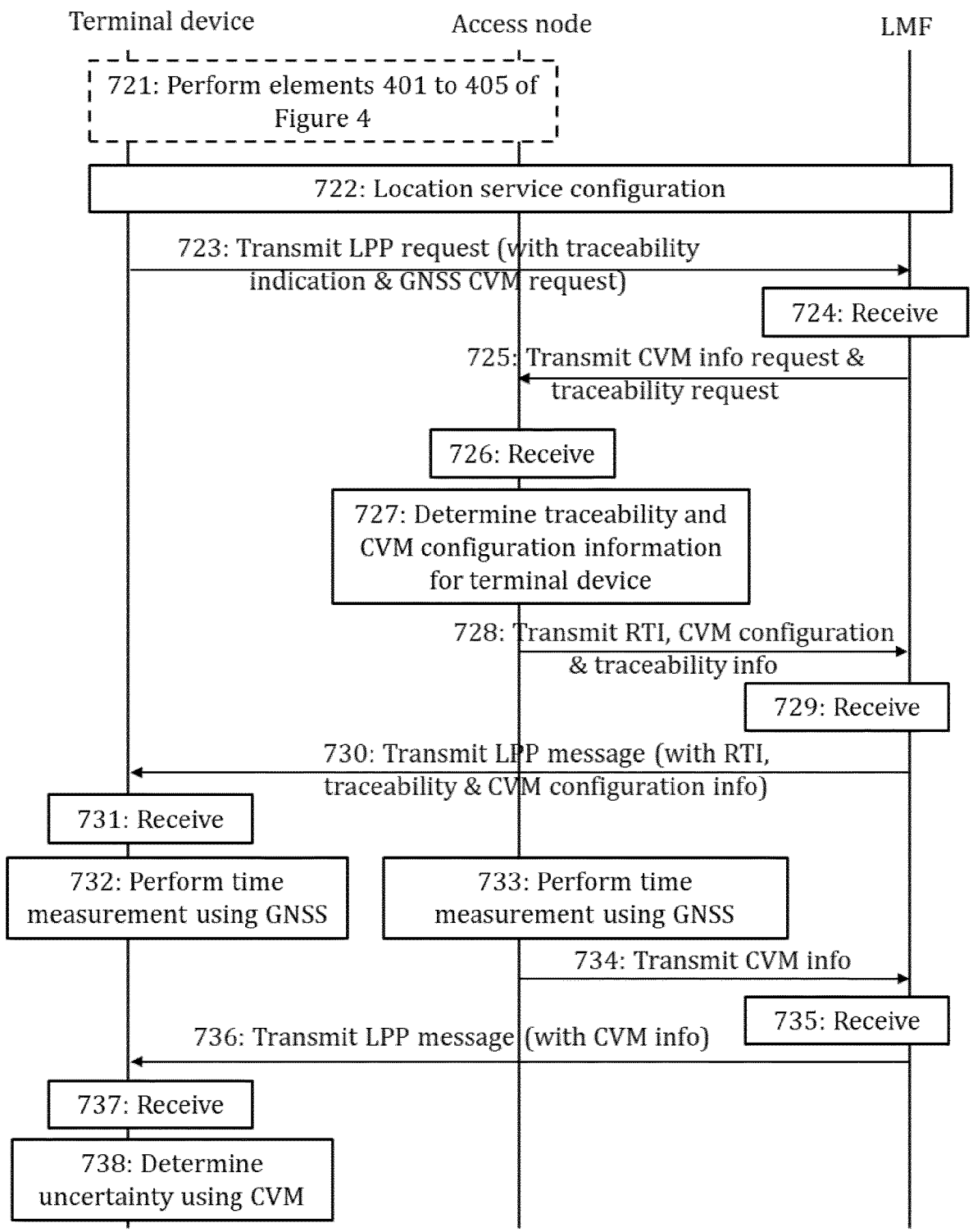

FIGS. 7A and 7B illustrate two alternative processes according to embodiments for enabling an estimation of the uncertainty of the clock of the terminal device by the terminal device using a common-view method based on LTE positioning protocol (LPP).

Specifically, FIGS. 7A and 7B illustrate signaling between a terminal device, an access node (being a serving access node of the terminal device) and location management function (LMF). Said terminal device may be, e.g., either of the terminal devices 100, 102 of FIG. 1. The LMF may be comprised in a core network 110 of FIG. 1. The access node may be the access node 104 of FIG. 1. The actions pertaining to the terminal device and/or the access node and/or the LMF may be performed or caused to be performed, in some embodiments, by an apparatus (e.g., a computing device) comprised in or communicatively connected to the terminal device and/or the access node and/or the LMF, respectively. The terminal device may be assumed here to comprise or be communicatively connected to a device-side TSN translator (DS-TT). In the following, the combination of the terminal device and the DS-TT (which may or may not form a part of the terminal device itself) is called simply a terminal device. The terminal device (and/or the access node) may comprise a GNSS receiver.

Referring to FIG. 7A, the actions relating to the initial block 701 may correspond fully to actions described in connection with elements 401 to 405 of FIG. 4. However, in some embodiments, some or all of the elements 401 to 405 may be omitted from block 701.

Following the establishment of the RRC connection (and possibly transmission of a SIB9 message), the terminal device (or specifically the DS-TT) performs, in block 702, location service (LCS) configuration with the access node and the LMF. In other words, the terminal device configures itself and the terminal device to be able to transmit long term evolution (LTE) positioning protocol (LPP) messages. This may comprise, e.g., receiving, by the terminal device, a location request from an LCS client. In general, LPP is a protocol allowing the positioning data exchange between the (LTE) network and the terminal device. LPP may be used, e.g., for positioning the terminal device and also point-to-point protocol for communication between the LMF (or a particular LCS server) and a terminal device (a LCS target device). Both user plane and control plane can be used for LPP and multiple LPP procedures are allowed for reducing latency whether in series or in parallel.

The terminal device transmits, in message 704, to the LMF via the access node, a LPP request for assistance data. In other words, the terminal device transmits the LPP request to the access node which then forwards it to the LMF. The LPP request comprises at least the indication of the preference for the time traceability to UTC and a request for GNSS CVM information (and for GNSS CVM configuration information) (i.e., a GNSS CVM data request). Said request comprises at least information on a GNSS used by the terminal device (and/or by the DS-TT) and at least one identifier of at least one satellite (currently) observable (or currently observed) by the terminal device. Additionally, the request may comprise information on a serving cell of the terminal device (e.g., a cell identifier of the serving cell of the terminal device) for facilitating the LMF in providing appropriate assistance data. The LPP request may be a LPP Request Assistance Data message. The LPP request is received by the LMF in block 705.

Then, the LMF transmits, in message 706, to the access node, a request for providing the terminal device traceability information and GNSS CVM information. Said request may comprise at least the indication of the preference for the time traceability to the UTC, said information on the GNSS used by the terminal device and at least one identifier of at least one satellite (currently) observable by the terminal device (as defined in message 704). Said request is received by the access node in block 707.

Following the reception of the request in block 707, the access node and the terminal device may carry out the procedure discussed previously in connection with elements 503 to 510 of FIG. 5.

In some embodiments, the access node may transmit one or both of the messages 504 and 508 of FIG. 5 (or at least some of their contents) also to the LMF.

FIG. 7B corresponds to an alternative implementation of the procedure of FIG. 7A. The procedure of FIG. 7B corresponds for the most part to the procedure of FIG. 7A with the differences lying in how closely the LMF is controlling the procedure. Namely, while in the procedure of FIG. 7A the downlink messages transmitted to the terminal device originated from the access node, in the procedure of FIG. 7B, all the downlink messages transmitted to the terminal device originate from the LMF. In other words, the procedure of FIG. 7B is more fully controlled by the LMF compared to the procedure of FIG. 7A.

Referring to FIG. 7B, the actions relating to the initial elements 721 to 724 may correspond fully to actions described in connection with elements 701 to 704. In some embodiments, some or all of the actions relating to element 721 may be omitted.

The LMF transmits, in message 725, to the access node, a request for traceability information for the terminal device and GNSS CVM configuration information for the terminal device. Said request may comprise at least at least the indication of the preference for the time traceability to UTC and said information on the GNSS used by the terminal device and at least one identifier of at least one satellite (currently) observable by the terminal device, like in the embodiment of FIG. 7A. Said request is received by the access node in block 726.

Upon reception of said request in block 726, the access node determines, in block 727, traceability information for enabling traceability of the clock of the access node to the UTC. The traceability information comprises at least information on a clock class indicative of a current status of the clock provided by the access node. In general, block 727 may correspond fully to block 203 of FIG. 2.

Furthermore, the access node determines, in block 727, GNSS CVM configuration information for the terminal device based on the request for the GNSS CVM configuration information (message 725). Block 727 may correspond to block 503 of FIG. 5 with the only difference being the entity from which the information used for the determining is received (i.e., said entity being here the LMF, instead of the terminal device as in FIG. 5).

The access node transmits, in message 728, GNSS CVM configuration information (i.e., GNSS time measurement timing information and information on at least one satellite (currently) observable by both the terminal device and the access node and possibly also information on the GNSS supported by the terminal device and the access node), the reference time information and the traceability information to the LMF. Said at least one satellite observable by both the terminal device and the access node may correspond here (at least) one of the at least one satellite defined in the LPP request (message 723). The access node may transmit, in message 728, also information on GPS time as derived by the access node.

Upon reception of message 728 in block 729, the LMF transmits, in message 730, to the terminal device via the access node, a first LPP message comprising reference time information (RTI, as defined in connection with previous embodiments), the traceability information and, as a first GNSS CVM data response, the GNSS CVM configuration information of the access node (and optionally also information on GPS time as derived by the access node). In other words, the LMF transmits the first LPP message to the access node which, in response to the reception of said first LPP message, forwards the first LPP message (as a downlink radio resource control message) to the terminal device. The first LPP message may be an LPP provide assistance data message. Alternatively, the access node may transmit a plurality of (consecutive) first DL RRC messages comprising together the RTI, the traceability information and the GNSS CVM configuration information.

The terminal device receives, in block 731, from the LMF via the access node, the first LPP message as defined above. Thereafter, the terminal device may store the information comprised in the LPP message or a part thereof to a memory (not shown in FIG. 7B). At least the traceability information may be stored to the memory.

The terminal device performs, in block 732, at least one GNSS time measurement via the GNSS receiver of the terminal device using (at least) said at least one satellite defined in the first LPP message 730, i.e., using a satellite which is (currently) observable by both the terminal device and the access node and which is, thus, suitable for CVM. At the same time, access node performs, in block 733, at least one (corresponding) GNSS time measurement using (at least) said at least one satellite defined in the first LPP message 730. In other words, the terminal device and the access node measure, in blocks 732, 733, the same common-view signal transmitted by said at least one satellite defined in the first LPP message 730. The concurrent or synchronized timing of the measurements in blocks 732, 733 is achieved using the GNSS time measurement timing information derived by the access node (included in the GNSS CVM configuration information). In general, the terminal device and/or the access node may be configured to perform GNSS time measurements periodically. Thus, two different (but concurrent) time measurements usable for CVM are derived.

The results of the at least one GNSS time measurement at the terminal device and/or at the access node (in blocks 732, 733) may be provided in the CGGTTS format. In other words, the terminal device and/or the access node may generate in blocks 732, 733 a CGGTTS file (i.e., a file following the CGGTTS standard).

In some embodiments, frequency may also be measured in connection with said at least one GNSS time measurement at the terminal device and/or at the access node (in blocks 723, 733).

Following the performing of said at least one GNSS time measurement at the access node, the access node transmits, in message 734, GNSS CVM information to the LMF. The GNSS CVM information comprises at least information on the results of the at least one GNSS time measurement, i.e., information on a GNSS time (i.e., epoch of the GNSS) acquired by the serving access node from said one of the at least one satellite. The GNSS CVM information may comprise also information on the GNSS (e.g., an identifier of the GNSS) and/or the at least one identifier of said at least one of the at least one satellite. The GNSS CVM information may also comprise time offset and/or correction information (at least if such information has not been provided as a part of said time information such as in a leapSeconds field of the timeInfo IE).

In some embodiments, the access node may transmit the GNSS CVM information directly to the terminal device, in addition or alternative to the transmission to the LMF.

Upon receiving, in block 735, the GNSS CVM information transmitted in message 734, the LMF transmits, in message 736, to the terminal device via the access node, a second LPP message comprising the GNSS CVM information (or at least the information on the results of the at least one GNSS time measurement performed by the access node). In other words, the LMF transmits the second LPP message to the access node which, in response to the reception of said second LPP message, forwards the second LPP message (as a downlink radio resource control message) to the terminal device. The second LPP message may be an LPP provide assistance data message.

Finally, upon reception of the second LPP message comprising the GNSS CVM information in block 737, the terminal device (or specifically the DS-TT) estimates, in block 738, time uncertainty of the clock at the terminal device using a common-view method based on the GNSS CVM information received from the access node and results of the at least one GNSS time measurement at the terminal device (similar to as described in connection with block 510 of FIG. 5). The estimation in block 510 may further be based on the (UTC) time information (e.g., the timeInfo field).

While above embodiments discussed in connection with FIGS. 2 to 6, 7A and 7B described specifically enabling traceability to the UTC, some alternative embodiments may be directed to enabling traceability to some other reference time standard, instead of the UTC. The above discussion applies, mutatis mutandis, for these alternative scenarios.

The blocks, related functions, and information exchanges described above by means of FIGS. 2 to 6, 7A and 7B are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 8:
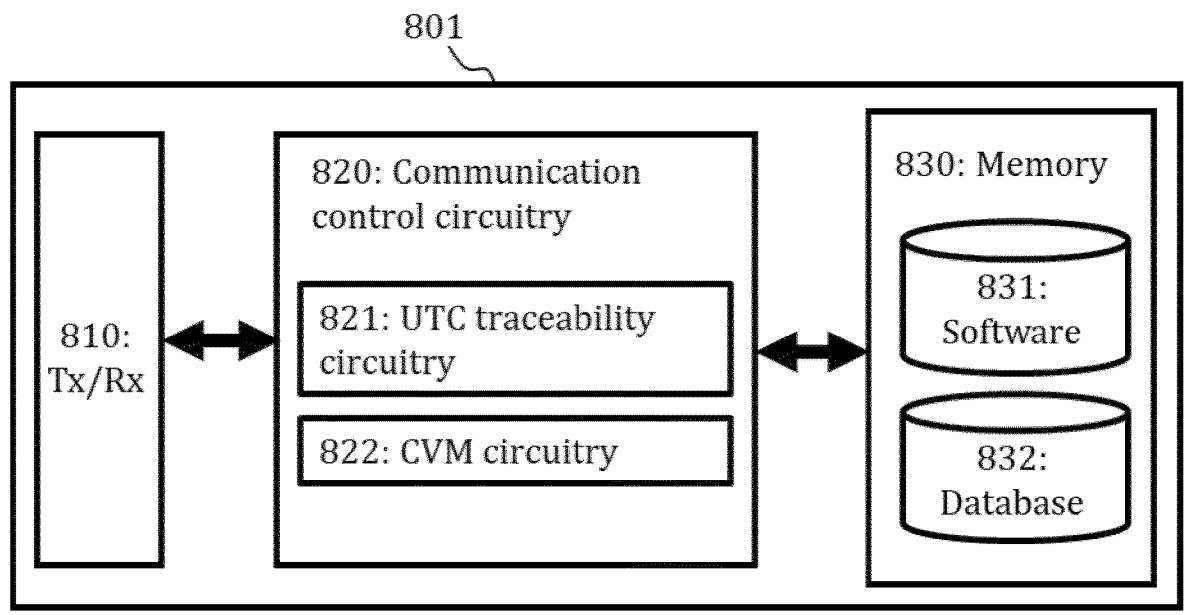
FIGS. 8 and 9 illustrate apparatuses according to embodiments.

FIG. 8 provides a terminal device 801 (apparatus, equipment, UE) according to some embodiments. Specifically, FIG. 8 illustrates a terminal device 801 configured to carry out at least the functions described above in connection with acquiring traceability information and performing CVM-related functionalities. The terminal device 801 may comprise one or more communication control circuitry 820, such as at least one processor, and at least one memory 830, including one or more algorithms 831, such as a computer program code (software) wherein the at least one memory and the computer program code (software) are configured, with the at least one processor, to cause the terminal device to carry out any one of the exemplified functionalities of the terminal device described above.

Referring to FIG. 8, the communication control circuitry 820 of the terminal device 801 comprise at least traceability circuitry 821 which is configured to perform traceability information-related functionalities. To this end, the traceability circuitry 821 is configured to carry out functionalities of the terminal device described above by means of any of FIGS. 2 to 4 using one or more individual circuitries. The traceability circuitry 821 may be, additionally or alternatively, configured to carry out traceability-related functionalities of the terminal device described above by means of any of FIGS. 5 to 6, 7A and 7B using one or more individual circuitries. The communication control circuitry 820 of the terminal device 801 further comprises CVM circuitry 822 which is configured to carry out a common-view method and associated processes. To this end, the CVM circuitry 822 is configured to carry out CVM-related functionalities of the terminal device described above by means of any of FIGS. 5 to 6, 7A and 7B using one or more individual circuitries.

Referring to FIG. 8, the memory 830 may be implemented using any suitable data storage technology, such as semiconductor based memory devices, flash memory, magnetic memory devices and systems, optical memory devices and systems, fixed memory and removable memory.

Referring to FIG. 8, the terminal device 801 may further comprise different interfaces 810 such as two or more communication interfaces (TX/RX) comprising hardware and/or software for realizing communication connectivity over the medium according to one or more communication protocols. The communication interface may provide the terminal device 801 with communication capabilities to communicate in the cellular communication system and enable communication between terminal devices and different network nodes or elements (e.g., different access nodes and the LMF), for example. The communication interface may comprise standard well-known components such as an amplifier, filter, frequency-converter, (de) modulator, and encoder/decoder circuitries, controlled by the corresponding controlling units, and one or more antennas. The communication interface may comprise or implement a GNSS or GPS receiver and/or a DS-TT. The terminal device 801 may also comprise different user interfaces.

Figure 9:
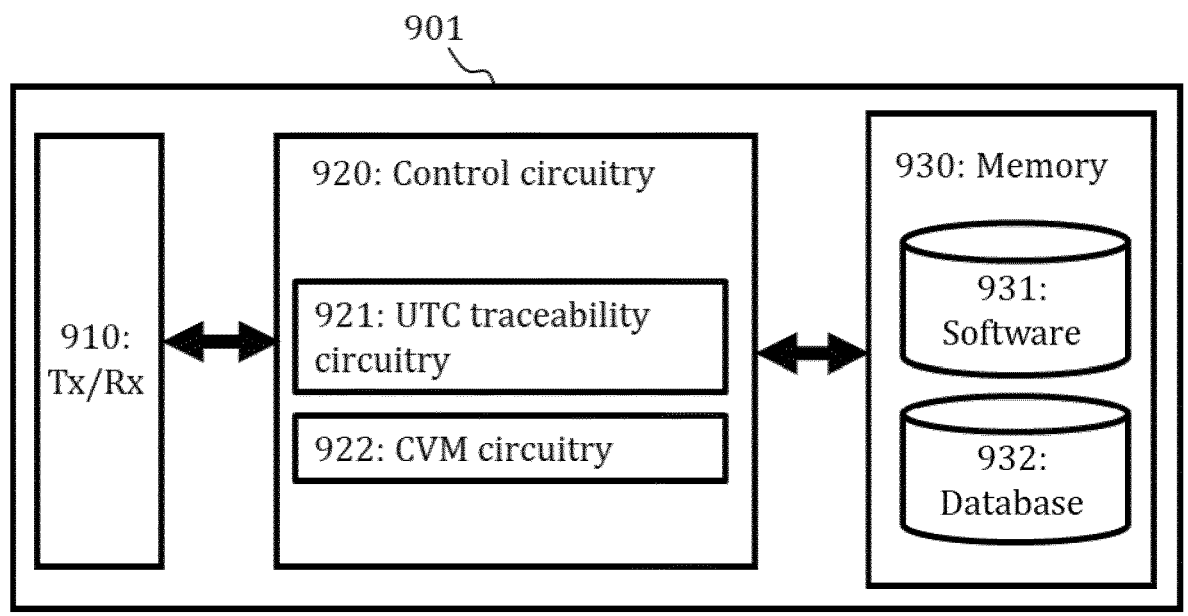

FIG. 9 provides an access node 901 (or a base station) according to some embodiments. Specifically, FIG. 9 illustrates an access node 901 configured to carry out at least the functions described above in connection with providing traceability information and/or CVM information to the terminal device. The access node 901 may comprise one or more communication control circuitry 920, such as at least one processor, and at least one memory 930, including one or more algorithms 931, such as a computer program code (software) wherein the at least one memory and the computer program code (software) are configured, with the at least one processor, to cause the access node to carry out any one of the exemplified functionalities of the access node described above.

Referring to FIG. 9, the communication control circuitry 920 of the access node 901 comprise at least traceability circuitry 921 which is configured to perform traceability information-related functionalities of the access node. To this end, the traceability circuitry 921 is configured to carry out functionalities of the access node described above by means of any of FIGS. 2 to 4 using one or more individual circuitries. The traceability circuitry 921 may be, additionally or alternatively, configured to carry out traceability-related functionalities of the terminal device described above by means of any of FIGS. 5 to 6, 7A and 7B using one or more individual circuitries. The communication control circuitry 920 of the access node 901 further comprises CVM circuitry 922 which is configured to carry out actions for enabling performing of a common-view method by a terminal device which the access node is serving. To this end, the CVM circuitry 922 is configured to carry out CVM-related functionalities of the access node described above by means of any of FIGS. 5 to 6, 7A and 7B using one or more individual circuitries.

Referring to FIG. 9, the memory 930 may be implemented using any suitable data storage technology, such as semiconductor based memory devices, flash memory, magnetic memory devices and systems, optical memory devices and systems, fixed memory and removable memory.

Referring to FIG. 9, the access node 901 may further comprise different interfaces 910 such as one or more communication interfaces (TX/RX) comprising hardware and/or software for realizing communication connectivity over the medium according to one or more communication protocols. The communication interface may provide the access node 901 with communication capabilities to communicate in the cellular communication system and enable communication between user devices (terminal devices) and different network nodes or elements and/or a communication interface to enable communication between different network nodes or elements, for example. The communication interface may comprise standard well-known components such as an amplifier, filter, frequency-converter, (de) modulator, and encoder/decoder circuitries, controlled by the corresponding controlling units, and one or more antennas. The communication interfaces may comprise optical interface components providing the base station with optical fiber communication capability.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory (ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 to 6, 7A and 7B may be carried out by an apparatus (e.g., computing device or a computing system) comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 6, 7A and 7B or operations thereof.

According to an embodiment, there is provided an apparatus comprising means for performing:

receiving, from a serving access node of a terminal device, a first downlink radio resource control message comprising reference time information for a clock provided by the serving access node and traceability information for enabling traceability of the clock to a reference time standard, wherein the traceability information comprises at least information on a clock class indicative of a current status of the clock provided by the serving access node.

According to an embodiment, there is provided an apparatus comprising means for performing:

receiving an uplink radio resource control message comprising an indication for preference for time traceability to a reference time standard from a terminal device or a request requesting the preference for the traceability to the reference time standard for the terminal device from a network function of a core network;

determining traceability information for enabling traceability of the clock of an access node to the reference time standard, wherein the traceability information comprises at least information on a clock class indicative of a current status of the clock provided by the access node; and causing transmitting, from the access node to the terminal device, a first downlink radio resource control message comprising reference time information for the clock and the traceability information for the clock.

In embodiments, the at least one processor, the memory, and the computer program code form processing means or comprises one or more computer program code portions for carrying out one or more operations according to any one of the embodiments of FIGS. 2 to 6, 7A and 7B or operations thereof.

Embodiments as described may also be carried out in the form of a computer process defined by a computer program or portions thereof. Embodiments of the methods described in connection with FIGS. 2 to 6, 7A and 7B may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor; and
   at least one memory including computer program code;
   the at least one memory and the computer program code configured, with the at least one processor, to cause the apparatus at least to perform:
   receiving, from a serving access node of a terminal device, a first downlink radio resource control message comprising reference time information for a clock provided by the serving access node and traceability information for enabling traceability of the clock to a reference time standard, wherein the traceability information comprises at least information on a clock class indicative of a current status of the clock provided by the serving access node.

2. The apparatus of claim 1, wherein the at least one memory and the computer program code are configured, with the at least one processor, to cause the apparatus to perform: storing at least the traceability information or a part thereof to the memory.

3. The apparatus according to claim 1, wherein the clock class is defined to have a value selected from a set of pre-defined values indicating different statuses of the clock, said set of pre-defined values comprising values indicative of one or more of the following:
   the serving access node is locked to a primary reference clock,
   the serving access node is in a holdover mode after losing the primary reference clock but still within a designated holdover specification,
   the serving access node is locked to a local clock,
   the serving access node is in the holdover mode after losing a local clock but still within the designated holdover specification and
   the serving access node is in the holdover mode and is no longer within the designated holdover specification.

4. The apparatus according to claim 3, wherein the designated holdover specification defines at least one or more pre-defined conditions for allowed clock drift.

5. The apparatus according to claim 1, wherein the at least one memory and the computer program code are configured, with the at least one processor, to cause the apparatus to perform, before the receiving:
   causing transmitting, from the terminal device to the serving access node, an uplink radio resource control message comprising an indication of preference for time traceability to the reference time standard.

6. The apparatus of claim 5, wherein the terminal device comprises a global positioning system receiver and the at least one memory and the computer program code are configured, with the at least one processor, to cause the apparatus to perform:
   causing performing at least one global positioning system time measurement via the global positioning system receiver from at least one satellite;
   receiving, before the transmitting, a SIB9 message from the serving access node, wherein the SIB9 message comprises at least time information acquired by the serving access node from at least one of said at least one satellite for determining a clock of the global positioning system, at least one identifier of said at least one of the at least one satellite and time offset information; and
   estimating time uncertainty at the terminal device using a common-view method based on the SIB9 message received from the serving access node and results of said at least one global positioning system time measurement.

7. The apparatus of claim 5, wherein the terminal device comprises a global navigation satellite system receiver,
   the uplink radio resource control message further comprises a request for global navigation satellite system common-view method information,
   said request for global navigation satellite system common-view method information comprises at least information on a global navigation satellite system used by the terminal device and at least one identifier of at least one satellite observable by the terminal device,
   the first downlink radio resource control message further comprises global navigation satellite system common-view method configuration information, said global navigation satellite system common-view method configuration information comprising at least global navigation satellite system time measurement timing information and information on at least one of the at least one satellite observable by both the terminal device and the serving access node,
   the global navigation satellite system common-view method information comprises at least information on global navigation satellite system time acquired by the serving access node from at least one of the at least one satellite and time offset and/or correction information,
   wherein the at least one memory and the computer program code are configured, with the at least one processor, to cause the apparatus to perform:
   causing performing, according to the global navigation satellite system time measurement timing information, at least one global navigation satellite system time measurement via the global navigation satellite system receiver using said at least one of the at least one satellite;
   receiving, from the serving access node, a second downlink radio resource control message comprising the global navigation satellite system common-view method information comprising at least information on global navigation satellite system time acquired by the serving access node from the at least one of the at least one satellite and time offset and/or correction information; and
   estimating time uncertainty at the terminal device using a common-view method based on the global navigation satellite system common-view method information received from the serving access node and results of said at least one GNSS time measurement.

8. The apparatus of claim 5, wherein the uplink radio resource control message comprises a long term evolution positioning protocol request for assistance data for forwarding to a location management function of a core network.

9. The apparatus of claim 5, wherein the terminal device comprises a global navigation satellite system receiver,
the uplink radio resource control message comprises a long term evolution positioning protocol request for assistance data for forwarding to a location management function of a core network,
the long term evolution positioning protocol request further comprises a request for global navigation satellite system common-view method information of the serving access node of the terminal device, said request comprising at least information on a global navigation satellite system used by the terminal device and at least one identifier of at least one satellite observable by the terminal device,
the first downlink radio resource control message corresponds to a first long term evolution positioning protocol message originating from the location management function further comprising the global navigation satellite system common-view method configuration information, said global navigation satellite system common-view method configuration information comprising at least global navigation satellite system time measurement timing information and information on at least one of the at least one satellite observable by both the terminal device and the serving access node and
the at least one memory and the computer program code are configured, with the at least one processor, to cause the apparatus to perform:
causing performing, according to the global navigation satellite system time measurement timing information, at least one global navigation satellite system time measurement via the global navigation satellite system receiver using said at least one of the at least one satellite;
receiving, from the location management function via the serving access node, a second long term evolution positioning protocol message comprising at least the global navigation satellite system common-view method information comprising at least information on global navigation satellite system time acquired by the serving access node from the at least one of the at least one satellite and time offset and/or correction information; and
causing estimating time uncertainty of the clock at the terminal device using a common-view method based on the global navigation satellite system common-view method information and results of said at least one global navigation satellite system time measurement.

10. The apparatus according to claim 1, wherein the terminal device comprises or is connected to a 5G modem and/or a device-side time sensitive networking translator.

11. An apparatus comprising:
at least one processor; and
at least one memory including computer program code;
the at least one memory and the computer program code configured, with the at least one processor, to cause the apparatus at least to perform:
receiving an uplink radio resource control message comprising an indication for preference for time traceability to a reference time standard for a terminal device from said terminal device or a request comprising said indication from a network function of a core network;
determining traceability information for enabling traceability of the clock of an access node to the reference time standard based on said indication, wherein the traceability information comprises at least information on a clock class indicative of a current status of the clock provided by the access node; and
causing transmitting, from the access node to the terminal device, a first downlink radio resource control message comprising reference time information for the clock and the traceability information for the clock.

12. The apparatus of claim 11, wherein the clock class is defined to have a value selected from a set of pre-defined values indicating different statuses of the clock, said set of pre-defined values comprising values indicative of one or more of the following:
the serving access node is locked to a primary reference clock,
the serving access node is in a holdover mode after losing the primary reference clock but still within a designated holdover specification,
the serving access node is locked to a local clock,
the serving access node is in the holdover mode after losing a local clock but still within the designated holdover specification and
the serving access node is in the holdover mode and is no longer within the designated holdover specification.

13. The apparatus of claim 12, wherein the designated holdover specification defines at least one or more pre-defined conditions for allowed clock drift.

14. The apparatus according to claim 11, wherein the at least one memory and the computer program code are configured, with the at least one processor, to cause the apparatus to perform, before the transmitting of the first downlink radio resource control message:
causing performing, in the access node, at least one global positioning system time measurement from at least one satellite; and
causing transmitting a SIB9 message from the access node to the terminal device, wherein the SIB9 message comprises at least time information acquired by the access node from at least one of said at least one satellite for determining a clock of the global positioning system, at least one identifier of said at least one of the at least one satellite and time offset information.

15. The apparatus according to claim 11, wherein the uplink radio resource control message or the request comprising said indication further comprises a request for global navigation satellite system common-view method information, said request for global navigation satellite system common-view method information comprising at least information on a global navigation satellite system used by the terminal device and at least one identifier of at least one satellite observable by the terminal device, the at least one memory and the computer program code being configured, with the at least one processor, to cause the apparatus to perform:
determining global navigation satellite system common-view method configuration information for the terminal device based on the request for global navigation satellite system common-view method information, wherein the global navigation satellite system common-view method configuration information comprises at least global navigation satellite system time measurement timing information and information on at least one of the at least one satellite observable by both the terminal device and the serving access node;

including the global navigation satellite system common-view method configuration information in the first downlink radio resource control message;

causing performing, according to the global navigation satellite system time measurement timing information at the access node, at least one global navigation satellite system time measurement using said at least one of the at least one satellite; and causing transmitting, to the terminal device, a second downlink radio resource control message comprising the global navigation satellite system common-view method information comprising at least information on global navigation satellite system time acquired by the access node from the at least one of the at least one satellite and time offset and/or correction information.

16. The apparatus according to claim 11, wherein the network function is a location management function and the at least one memory and the computer program code are configured, with the at least one processor, to cause the apparatus to perform:

receiving, from the location management function, said request comprising said indication, wherein said request further comprises a request for the global navigation satellite system common-view method information, said request for global navigation satellite system common-view method information comprising at least information on a global navigation satellite system used by the terminal device and at least one identifier of at least one satellite observable by the terminal device;

determining global navigation satellite system common-view method configuration information for the terminal device based on said request for the global navigation satellite system common-view method information, wherein the global navigation satellite system common-view method configuration information comprises at least global navigation satellite system time measurement timing information and information on at least one of the at least one satellite observable by both the terminal device and the serving access;

causing transmitting the reference time information, the traceability information and said global navigation satellite system common-view method information to the location management function;

causing forwarding, in response to receiving a first long term evolution positioning protocol message from the location management function, the first long term evolution positioning protocol message as the first downlink radio resource control message to the terminal device, wherein the first long term evolution positing protocol message comprises the global navigation satellite system common-view method configuration information;

causing performing, according to the global navigation satellite system time measurement timing information at the access node, at least one global navigation satellite system time measurement using said at least one of the at least one satellite;

causing transmitting, to the location management function, the global navigation satellite system common-view method information comprising at least information on global navigation satellite system time acquired by the access node from the at least one of the at least one satellite and time offset and/or correction information; and causing forwarding, in response to receiving a second long term evolution positioning protocol message comprising the global navigation satellite system common-view method information from the location management function, the second long term evolution positioning protocol message as a second downlink radio resource control message to the terminal device.

17. The apparatus according to claim 11, wherein the at least one memory and the computer program code are configured, with the at least one processor, to cause the apparatus to perform the receiving of the request comprising said indication from the network function, wherein the request is a time synchronization service request comprising the indication indicating the preference for the traceability to the reference time standard for the terminal device and the network function is an application function.

18. The apparatus according to claim 11, wherein the network function is an application function or a location management function.

19. The apparatus according to claim 1, wherein the reference time standard is coordinated universal time.

20. The apparatus according to claim 11, wherein the reference time standard is coordinated universal time.

* * * * *